United States Patent Office 3,746,674
Patented July 17, 1973

3,746,674
VULCANIZATION OF HALOGEN-CONTAINING ACRYLIC ELASTOMERS
Rudolf Adolf Behrens, Gladstone, N.J., assignor to American Cyanamid Company, Stamford, Conn.
No Drawing. Filed June 30, 1971, Ser. No. 158,600
Int. Cl. C08f 27/06
U.S. Cl. 260—23 AR          12 Claims

ABSTRACT OF THE DISCLOSURE

A vulcanization composition is provided which comprises a halogen- or epoxy-containing polyacrylate elastomer, from about 0.05 to 2.5 percent of sulfur, from about 0.5 to 7 percent of an alkali metal salt of an organic carboxylic acid and from about 0.25 to 3 percent of sodium or potassium acetate or propionate based on the weight of the elastomer. In addition, an improved process for vulcanizing the elastomers is provided which comprises adding to a soap and sulfur vulcanization composition from about 0.25 to 3 percent of sodium or potassium acetate or propionate.

---

Generally stated the subject matter of the present invention relates to an improved vulcanization system for particular synthetic elastomeric polymers. More particularly, the invention relates to an improved vulcanization system comprising sulfur, an alkali metal salt of an organic carboxylic acid and sodium or potassium acetate or propionate.

BACKGROUND OF THE INVENTION

Vulcanization systems comprising sulfur and an alkali metal salt of an organic carboxylic acid, hereinafter referred to as a soap and sulfur cure system, were originally disclosed and claimed in U.S. Pat. No. 3,458,461 issued on July 29, 1969 to F. F. Mihal. This soap and sulfur cure system provided better mold release, reduced corrosion of mold, better economy, freedom from offensive fumes and vapors, optional elimination of post-curing and excellent bin stability.

An improvement in the soap and sulfur cure system was disclosed in U.S. Pat. No. 3,506,624 issued on Apr. 14, 1970 to R. A. Behrens. The improvement comprised the utilization of a combination of sulfur, an alkali metal salt of an organic carboxylic acid and an N-substituted-mono or bis-maleimide. This system provided the additional advantages of improved processing safety and good cure rate.

The present invention represents the culmination of a long series of investigations conducted largely by the inventor and his associates directed to improving the soap and sulfur cure system.

Accordingly, it is a primary object of this invention to provide a new and improved soap and sulfur cure system for vulcanizing particular synthetic elastomeric polymers. Another object of this invention is to provide a cured elastomer having improved properties of air aging.

Additional objects and advantages will be set forth in part in the description which follows, and in part will be obvious from the description or may be learned by the practice of the invention, the objects and advantages being realized and attained by means of compositions and improvements, particularly pointed out in the appended claims.

THE INVENTION

To achieve the foregoing objects and in accordance with its purposes, as embodied and broadly described the present invention provides an improved vulcanization comprising a halogen or epoxy-containing polyacrylate elastomer, from about .05 to 2.5 percent of sulfur, from about 0.5 to 7 percent of an alkali metal salt of an organic carboxylic acid and from about 0.25 to 3 percent of sodium or potassium acetate or propionate based on the weight of the elastomeric polymer.

The invention also provides an improved soap and sulfur cure system which comprises adding to such system 0.25 to 3 of sodium or potassium acetate or propionate.

The invention constitutes the novel methods, processes, steps and improvements herein shown and described.

It is to be understood that both the foregoing general description and the following detailed description are exemplary and explanatory and are not restrictive of the invention.

The present invention resides in the discovery that the addition of sodium or potassium acetate or propionate to a soap and sulfur cure system results in improving the ability of the cured elastomer to retain its physical properties after exposure to air at elevated temperatures, which is generally described as air aging. This is a particularly unexpected and surprising result since the use of sodium or potassium acetate or propionate as the soap component in a soap and sulfur cure system is not recommended because of their slow cure rate.

As employed in the instant specication and claims, the term halogen or epoxy-containing polyacrylate elastomers is defined to comprise the following:

The halogen-containing acrylate polymers, which are typically copolymers of an alkyl acrylate, particularly a lower alkyl acrylate, and a minor amount of compatible vinyl or allyl monomer containing a halogen atom, generally a chlorine atom. These include copolymers of one or more lower alkyl acrylates with a halogen-containing monomer; copolymers of one or more alkyl acrylates with other compatible acrylate monomers, including alkoxyalkylacrylates, thioalkylacrylates, alkylthioalkyl acrylates, alkoxythioalkyl acrylates, cyanoalkyl acrylates, cyanoalkoxyalkyl acrylates, cyanothioalkyl acrylates, with a halogen-containing monomer; and copolymers of the above with other compatible vinyl monomers, such as acrylonitrile, with a halogen-containing monomer.

The acrylic acid component of the composition comprises one or more lower alkyl acrylates, i.e., esters of acrylic acid and an alcohol containing from about 1 to 8 carbon atoms, such as methyl, ethyl, n-butyl, n-hexyl and n-octylacrylates.

The compatible halogen-containing, preferably chlorine-containing comonomers include vinyl chloroacetate, vinyl chloropropionate, allyl chloropropionate, 2-chloroethyl vinylether, 2-chloroethylacrylates, and the like, and chlorine containing monomers having the formula:

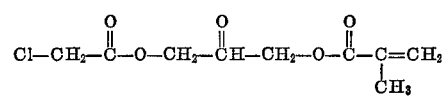

and

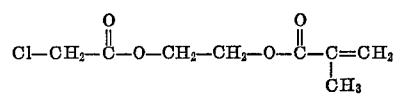

Also included are the chloroprene polymers, including homopolymers and copolymers of chloroprene(2-chloro-1,3-butadiene) with other vinyl or diene comonomers.

Lastly, the acrylate polymers containing epoxy groups are also included. Such polymers include homopolymers and copolymers of epoxy-containing acrylate or methacrylate monomers, for example, glycidyl methacrylate and allyl glycidyl ether.

Examples of useful copolymers include those of ethylacrylate and about 5 weight percent of chloroethyl vinylether, copolymers of ethylacrylate and about 5 weight percent of 2-chloroethylacrylate, and copolymers of about 70 weight percent or more of ethylacrylate and up to 15 weight percent of vinylchloroacetate. Particularly effective applications of this invention are in the vulcanization of copolymers of ethyl acrylate and vinyl chloroacetate (the product of copolymerization of about 5% vinylchloroacetate and 95% ethylacrylate); copolymers of ethyl and butylacrylate, methoxyethyl or ethoxyethyl acrylate and vinylchloroacetate; and copolymers of butyl acrylate, cyanoethyl acrylate and vinyl chloroacetate. Normally, the halogen or epoxy-containing monomer represents a minor proportion of the total monomer mixture, for example, up to about 10% by weight.

The amount of sulfur used in curing the compositions of this invention should be between 0.05% and 2.5% preferably between 0.2% and 1.0%, based on the weight of the elastomer.

The preferred alkali metal salts which may be used as the soap component of the soap and sulfur cure system include the sodium, and potassium salts of caproic acid, caprylic acid, lauric acid, stearic acid, tartaric acid, pimelic acid, sebacic acid, 2-ethylhexanoic acid, and the like. The amount of alkali metal salt used should be between 0.5% and 7%, preferably between 2% and 5%, based on the weight of the elastomer.

The amount of sodium or potassium acetate or propionate used in combination with the sulfur and other metal carboxylates should be between 0.25% and 3% preferably between 0.5% and 2%, based on the weight of the elastomer.

Within the ranges specified considerable variation is possible without detracting from the beneficial results of the invention. In other words, the total amount of sodium or potassium acetate or propionate in combination with the other alkali metal carboxylates can be varied to provide the desired cure rate and degree of processing safety, provided the amount of sodium or potassium acetate or propionate used is sufficient to impart to the vulcanized elastomer improved air aging properties.

Vulcanization according to the present invention comprises compounding the unvulcanized elastomer with sulfur, an alkali metal carboxylate and sodium or potassium acetate or propionate. The compounding can be done on a rubber mill by standard procedures. The compounded rubber is then cured at an elevated temperature, above about 150° C. as in a heated mold.

When a maleimide is used in conjunction with sulfur and the alkali metal salt of a carboxylic acid, the amount may vary over a wide range, depending on the particular application for which the system is designed. Normally, the maleimide will be used in a range of from about 0.25% and 5%, preferably 0.5% to 1.5% by weight, based on the weight of the elastomer. Generally, as the amount of maleimide is increased the rate of cure and level of cure are increased with at most only a slight decrease in the processing safety, the amount of sulfur and alkali metal carboxylate remaining constant.

Additives normally used in compounding elastomers may be added at the time of compounding the elastomer. These include carbon black, other fillers, pigments, antioxidants, stabilizers, and other conventional materials. Organic acids, such as stearic acid, are sometimes added to retard the cure, thereby providing an additional measure of control of the cure rate.

As employed in the instant specification and claims all percentages are expressed as percent by weight based on the synthetic elastomeric polymer.

The following example is provided for illustrative purposes and may include particular features of the invention. However, the example should not be construed as limiting the invention, many variations of which are possible without departing from the spirit or scope thereof.

EXAMPLE 1

Compositions were prepared as follows:

| Common to all: | Parts |
| --- | --- |
| Elastomer* | 100 |
| FEF carbon black | 60 |
| Stearic acid | 0.5 |
| Sulfur | 0.25 |

* Copolymer of 94% of a mixture of ethyl and butyl acrylate and 6% vinylchloroacetate.

| | A | B | C | D | E | F |
| --- | --- | --- | --- | --- | --- | --- |
| Sodium 2-ethylhexanoate | 4 | | | | 2.5 | 1.5 |
| Sodium acetate | | 4 | | | 1.5 | 1.0 |
| Sodium propionate | | | 4 | | | 1.0 |
| Sodium oleate | | | | 4 | | |
| Monsanto oscillating disc rheometer at 330° F.: | | | | | | |
| Maximum cure rate | 4.4 | 0.8 | 1.5 | 0.9 | 2.9 | 2.4 |
| Rise in torque in 5 min (in lbs.) | 24 | 2 | 2.5 | 4 | 14 | 12.5 |
| Stress-strain properties: Cured 15 min. at 330° F. original: | | | | | | |
| Modulus at 100%, p.s.i | 1,250 | 900 | 1,300 | 910 | 1,300 | 1,280 |
| Tensile, p.s.i | 1,760 | 1,820 | 1,850 | 1,750 | 2,850 | 1,930 |
| Elongation, percent | 140 | 190 | 140 | 190 | 130 | 130 |
| Shore A hardness | 65 | 70 | 71 | 68 | 71 | 75 |
| Stress-strain properties: Air aged in oven at 176° C. for one week: | | | | | | |
| Tensile, p.s.i | 700 | 1,665 | 1,600 | 750 | 1,425 | 1,490 |
| Elongation, percent | 55 | 90 | 80 | 35 | 80 | 80 |
| Shore A hardness | 80 | 85 | 85 | 85 | 80 | 82 |

The data show that sodium acetate and sodium propionate, used alone, are slow curing but provide good retention of properties on air aging. Sodium 2-ethylhexanoate is fast but provides poor retention of properties, and sodium oleate is slow curing and also gives poor retention of properties on aging. Compositions E and F are illustrations of this invention and show improved cure rate over the Compositions B, C and D and also improved aging over Composition D. Although not as fast curing as A, the compositions are superior in air aging properties over A.

What is claimed:

1. In a halogen- or epoxy-containing polyacrylate elastomer vulcanization composition comprising the elastomer, from 0.05 to 2.5 percent sulfur and from about 0.5 to 7 percent of an alkali metal salt of an organic carboxylic acid, selected from the group consisting of caproic, caprylic, lauric, stearic, tartaric, pimelic, sebacic and 2-ethylhexanoic acids the improvement which comprises the addition of from about 0.25 to 3 percent of sodium or potassium acetate or propionate.

2. A composition according to claim 1 wherein the elastomer is a halogen-containing elastomer.

3. A composition according to claim 1 wherein the elastomer is an epoxy-containing elastomer.

4. A composition according to claim 1 wherein the acetate is sodium acetate.

5. A composition according to claim 1 wherein the propionate is sodium propionate.

6. A composition according to claim 1 wherein the acetate is potassium acetate.

7. A composition according to claim 1 wherein the propionate is potassium propionate.

8. A composition according to claim 1 wherein the alkali metal salt of an organic carboxylic acid is selected from the group consisting of sodium or potassium salts of stearic acid, caprylic acid and 2-ethylhexanoic acid.

9. A composition according to claim 1 wherein the elastomer is a copolymer of ethyl acrylate and 5 percent vinyl chloroacetate.

10. A composition according to claim 1 wherein the elastomer is a copolymer of at least one lower alkyl arcylate and vinyl chloroacetate.

11. A composition according to claim 1 wherein the elastomer is a terpolymer of ethyl acrylate and butyl acrylate with 6 percent vinyl chloroacetate.

12. A process for improving the air-aging of a vulcanized halogen- or epoxy-containing polyacrylate elastomer which comprises adding from about 0.25 to 3 percent of sodium or potassium acetate or propionate to a vulcanization composition comprising a halogen- or epoxy-containing polyacrylate elastomer, from about 0.5 to 5 percent of sulfur and from about 0.5 to 7 percent of an alkali metal salt of an organic carboxylic acid selected from the group consisting of caproic, caprylic, lauric, stearic, tartaric, pimelic, sebacic and 2-ethylhexanoic acids.

References Cited

UNITED STATES PATENTS

| | | | |
|---|---|---|---|
| 3,450,681 | 6/1969 | Gobran | 260—80.72 |
| 3,458,461 | 7/1969 | Mihal | 260—23 |
| 3,493,548 | 2/1970 | Chalmers | 260—79.7 |
| 3,506,624 | 4/1970 | Behrens | 260—78.4 |
| 3,607,847 | 9/1971 | Troussier | 260—86.1 |

JOSEPH L. SCHOFER, Primary Examiner

C. A. HENDERSON, JR., Assistant Examiner

U.S. Cl. X.R.

260—79.5 R, 79.5 P, 80.81

Case No. 24,179

UNITED STATES PATENT OFFICE
CERTIFICATE OF CORRECTION

Patent No. 3,746,674          Dated July 17, 1973

Inventor(s) RUDOLF ADOLF BEHRENS

It is certified that error appears in the above-identified patent and that said Letters Patent are hereby corrected as shown below:

Column 1, line 71, after the word "vulcanization" and before the word "comprising" please insert the word -- composition --.

Column 2, line 25, "specication" should read -- specification --.

Column 3, line 50, "cured" should read -- curved --.

Column 4, Example I, Table, line 26, Tensile psi, letter E "2650" should read -- 1850 --.

Signed and sealed this 18th day of December 1973.

(SEAL)
Attest:

EDWARD M. FLETCHER, JR.          RENE D. TEGTMEYER
Attesting Officer                Acting Commissioner of Patents